United States Patent
Pramod (10) Patent No.: US 11,349,416 B2
(45) Date of Patent: May 31, 2022

(54) FEEDBACK COMPENSATION OF PARAMETER IMBALANCE INDUCED CURRENT HARMONICS IN SYNCHRONOUS MOTOR DRIVES

(71) Applicant: STEERING SOLUTIONS IP HOLDING CORPORATION, Saginaw, MI (US)

(72) Inventor: Prerit Pramod, Saginaw, MI (US)

(73) Assignee: Steering Solutions IP Holding Corporation, Saginaw, MI (US)

(*) Notice: Subject to any disclaimer, the term of this patent is extended or adjusted under 35 U.S.C. 154(b) by 69 days.

(21) Appl. No.: 16/855,858

(22) Filed: Apr. 22, 2020

(65) Prior Publication Data

US 2021/0336567 A1    Oct. 28, 2021

(51) Int. Cl.
| | |
|---|---|
| H02K 29/06 | (2006.01) |
| H02P 6/10 | (2006.01) |
| H02P 21/22 | (2016.01) |
| H02P 21/18 | (2016.01) |
| H02P 6/16 | (2016.01) |
| B62D 5/04 | (2006.01) |
| H02P 27/08 | (2006.01) |

(52) U.S. Cl.
CPC .............. *H02P 6/10* (2013.01); *B62D 5/0463* (2013.01); *H02P 6/16* (2013.01); *H02P 21/18* (2016.02); *H02P 21/22* (2016.02); *H02P 27/08* (2013.01); *H02P 2207/05* (2013.01)

(58) Field of Classification Search
CPC .. H02P 6/10; H02P 21/18; H02P 21/22; H02P 6/16; H02P 27/08; B62D 5/0463
USPC ..................................................... 318/400.23
See application file for complete search history.

(56) References Cited

U.S. PATENT DOCUMENTS

| | | | |
|---|---|---|---|
| 2011/0255307 A1* | 10/2011 | Kim ........................ | H02J 3/381 363/13 |
| 2013/0082636 A1* | 4/2013 | Ohori ..................... | H03H 17/06 318/723 |
| 2017/0366128 A1* | 12/2017 | Vaks ..................... | H02P 25/092 |
| 2018/0351496 A1* | 12/2018 | Vaks ....................... | G05B 5/01 |
| 2019/0052210 A1* | 2/2019 | Li ....................... | H02M 7/5395 |
| 2021/0067066 A1* | 3/2021 | Takahashi ............... | H02P 21/05 |

* cited by examiner

Primary Examiner — Erick D Glass
(74) Attorney, Agent, or Firm — Dickinson Wright PLLC (57) ABSTRACT

A method for compensating parameter imbalance induced current harmonics in a synchronous motor drive includes reading an output current signal and extracting, based on the output current signal, a signature of a parameter imbalance corresponding to the synchronous motor drive. The method also includes compensating, based on the signature, for the current harmonics induced by parameter imbalance in a closed loop using a feedback path.

20 Claims, 4 Drawing Sheets

FEEDBACK COMPENSATION OF PARAMETER IMBALANCE INDUCED CURRENT HARMONICS IN SYNCHRONOUS MOTOR DRIVES

TECHNICAL FIELD

This disclosure relates to electric motors and in particular to systems and methods for feedback or closed-loop compensation of current harmonics caused by parameter imbalances in synchronous motor drives.

BACKGROUND OF THE INVENTION

Vehicles, such as cars, trucks, sport utility vehicles, crossovers, mini-vans, or other suitable vehicles, may include an electric power steering (EPS) system. Such EPS systems typically include an electric motor for providing steering assist during operation of a vehicle. To provide such steering assist, the EPS system may drive the electric motor according to a method of torque control. Typically, electric motor drive applications utilizing synchronous machines may be susceptible to parameter imbalances during manufacturing and/or during operation. Such inter-phase parameter imbalance may cause the generation of undesirable current harmonics during operation of the synchronous motor drive.

To reduce and/or minimize inter-phase parameter imbalance, some requirements and/or regulations specify that such electric machines satisfy minimal part-to-part variation. This is especially true for high performance motion control applications that are noise, vibration, and harshness sensitive, particularly ones involving mass manufacturing, such as an EPS. Stringent requirements specifying that the machines satisfy a minimal part-to-part variation may be costly. This necessitates the need for development of control techniques that enable mitigation of current harmonics generated responsive to parameter imbalances in synchronous motors.

SUMMARY OF THE INVENTION

This disclosure relates generally to feedback compensation of current harmonics caused by parameter imbalances in synchronous motor drives.

An aspect of the disclosed embodiments includes a system for compensating parameter imbalance induced current harmonics in a synchronous motor drive. The system includes a synchronous motor controlled by the synchronous motor drive, a processor, and a memory. The memory includes instructions that, when executed by the processor, cause the processor to: read an output current signal; extract, based on the output current signal, a signature of a parameter imbalance corresponding to the synchronous motor drive; and compensate, based on the signature, for the current harmonics induced by parameter imbalance in a closed loop using a feedback path.

Another aspect of the disclosed embodiments includes a method for compensating parameter imbalance induced current harmonics in a synchronous motor drive. The method includes reading an output current signal and extracting, based on the output current signal, a signature of a parameter imbalance corresponding to the synchronous motor drive. The method also includes compensating, based on the signature, for the current harmonics induced by parameter imbalance in a closed loop using a feedback path.

Another aspect of the disclosed embodiments includes a system for compensating parameter imbalance induced current harmonics in a synchronous motor drive. The system includes a processor and a memory. The method includes instructions that, when executed by the processor, cause the processor to: read an output current signal; extract, based on the output current signal, a signature of a parameter imbalance corresponding to a synchronous motor drive; compensate, based on the signature, for the current harmonics induced by parameter imbalance in a closed loop using a feedback path by generating a correction voltage command term; and applying the correction voltage command term to a base voltage command to output a final voltage command to a pulse width modulator that operates an inverter of the synchronous motor drive.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

The following discussion is directed to various embodiments of the disclosed subject matter. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As described, vehicles, such as cars, trucks, sport utility vehicles, crossovers, mini-vans, or other suitable vehicles, may include an electric power steering (EPS) system. Such EPS systems typically include an electric motor for providing steering assist during operation of a vehicle. To provide such steering assist, the EPS system may drive the electric motor according to a method of torque control. Typically, electric motor drive applications utilizing synchronous machines may be susceptible to parameter imbalances during manufacturing and/or during operation. Such inter-phase parameter imbalance may cause the generation of undesirable current harmonics during operation of the synchronous motor drive.

To reduce and/or minimize inter-phase parameter imbalance, some requirements and/or regulations specify that such electric machines satisfy minimal part-to-part variation. This is especially true for high performance motion control applications that are noise, vibration, and harshness sensitive, particularly ones involving mass manufacturing, such as an EPS. Stringent requirements specifying that the machines satisfy a minimal part-to-part variation may be costly. This necessitates the need for development of control techniques that enable mitigation of current harmonics generated responsive to parameter imbalances in synchronous motors.

As will be described, motion control applications (e.g., vehicles, boats, airplanes, drones, power equipment, yard equipment, pumps, compressors, and the like) utilizing synchronous motor drives may be susceptible to parameter imbalances during manufacturing and/or during operation. For example, a motor drive, converter, and/or other circuitry may experience a parameter imbalance.

High performance motion control system applications, particularly ones involving mass manufacturing such as electric power steering (EPS), may be sensitive to noise, vibration, and harshness (NVH) and may specify minimal part-to-part variation. Parameter imbalance(s) that are left uncorrected in such systems may result in a degradation of the overall system performance. However, enforcing tight tolerance on the allowable parameter imbalances on the manufacturing side and/or on the production side of synchronous motors may be expensive. Further, the overall system performance degradation may reduce the longevity of the synchronous motors, and/or may reduce the likelihood that a customer may purchase an EPS system that includes the synchronous motor. As a result, it is desirable to compensate or correct the current harmonics produced responsive to such parameter imbalances.

Certain non-linear effects, such as temperatures or failure modes may result in a significant change in the behavior of a machine. These non-linear effects may be manifest as parameter imbalance in the synchronous motor drive. Compensation of such non-linear effects may be beneficial for improving performance of motor drive systems employing such machines.

Accordingly, systems and methods, such as those described herein, may be configured to address the issues above by providing techniques for feedback or closed-loop compensation of current harmonics caused by parameter imbalances in synchronous motor drives.

In some embodiments, the systems and methods described herein may be configured to provide techniques for real-time compensation of inter-phase parameter imbalance in synchronous motor drives.

In some embodiments, the systems and methods described herein may be configured to perform a preventative action based on the magnitude of the correction terms generated by the closed-loop parameter imbalance compensator. The preventative action may include disabling the parameter imbalance compensation, shutting off the motor drive system, and/or other suitable preventative action.

The systems and methods described herein are configured to provide at least the benefits of detecting and identifying any type of parameter imbalance in a synchronous motor. The systems and methods described herein are applicable for various synchronous machine configurations (e.g., permanent magnet or wound rotor synchronous machines, non-salient pole or salient pole machines, multi-phase machines, etc.). Further, the systems and methods described herein may be implemented by a processor for real-time correction of current harmonics induced by parameter imbalances while the synchronous motor is being operated.

Figure 1:
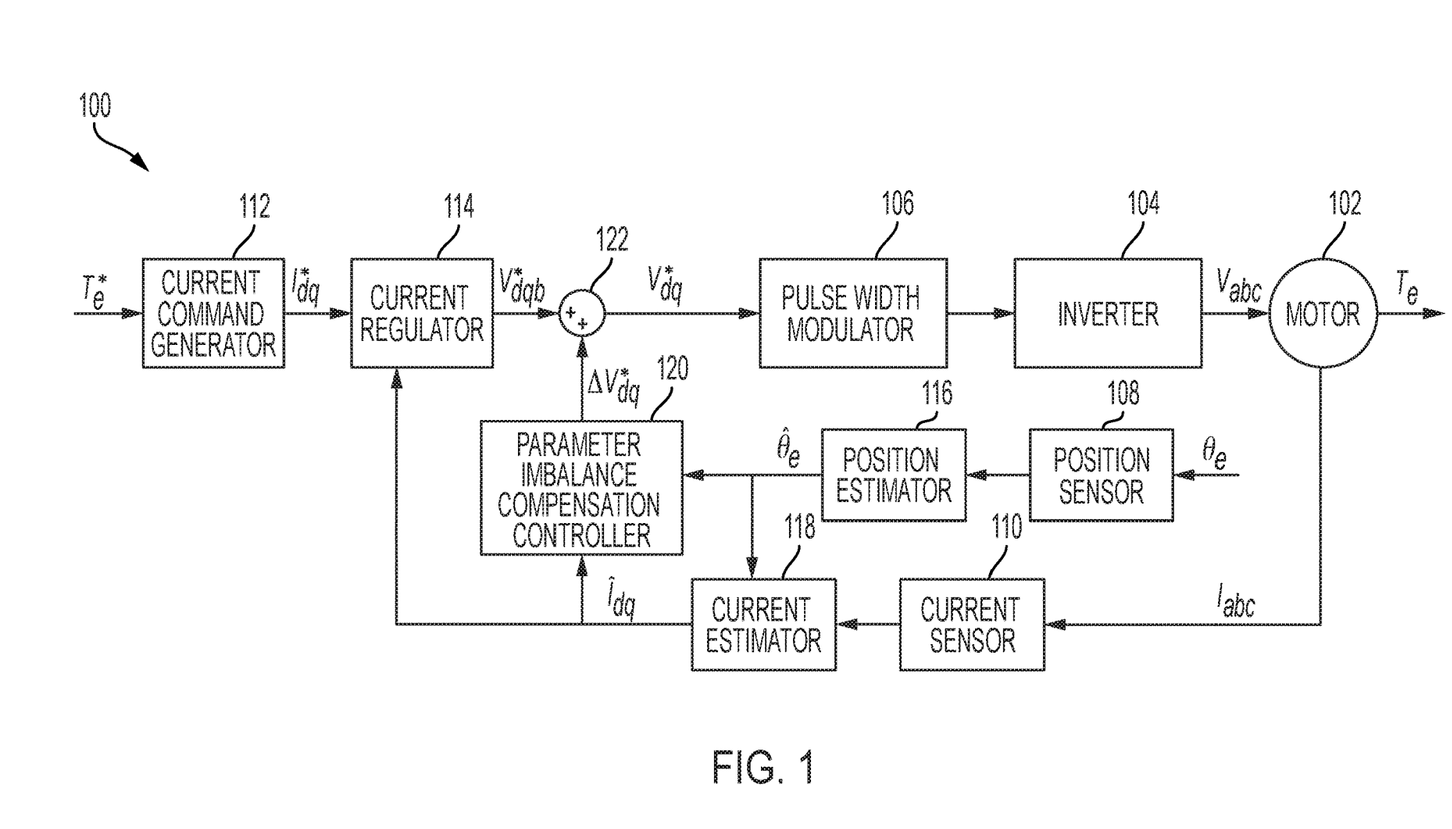
FIG. 1 generally illustrates a synchronous motor drive system with feedback compensation of current harmonics caused by parameter imbalances according to principles of the present disclosure.

FIG. 1 generally illustrates a synchronous motor drive system 100 with feedback compensation of current harmonics caused by parameter imbalances according to principles of the present disclosure. The system 100 may include a current command generator 112, a current regulator 114, a parameter imbalance compensation controller 120 (e.g., which may be referred to as the controller 120), a pulse width modulator 106, an inverter 104, an alternating current (AC) motor 102, a current sensor 110, a current estimator 118, a position estimator 116, and a position sensor 108.

In some embodiments, the current regulator 114, the pulse width modulator 106, the inverter 104, the motor 102, the current sensor 110, and the current estimator 118 form a closed-loop current control system. The depicted system 100 also includes another closed-loop within the current control system. For example, the current regulator 114, controller 120, the current sensor 110, and the current estimator 118 form a closed-loop current harmonic compensation system. It should be noted that fewer or more components may be included in the system 100 as desired to perform the techniques disclosed herein and the components depicted are for explanatory purposes.

In some embodiments, the closed-loop current harmonic compensation system may function as follows. The current regulator 114 receives a command or reference current and outputs a corresponding output voltage command signal. The controller 120 receives the output voltage signal. The position sensor 108 may be configured to sense a position of the motor 102. The position sensor 108 may communicate the sensed position to the position estimator 116. The position estimator 116 may estimate one or more positions of the motor 102 based on the position sensed by the position sensor 108.

With the foregoing described, additional details and operation of the system 100 will now be discussed. The motor 102 may generate rotational or linear force used to power a machine, such as those described herein. The motor 102 may include a constant speed motor or other suitable motor. The system 100 may selectively control electrical energy provided to the motor 102. The system 100 may provide the electrical energy to the motor 102 in varying amounts and at varying frequencies, thereby indirectly controlling the speed and torque of the motor 102.

The current sensor 110 may include any suitable current sensor configured to sense or measure an electric current in a circuit. The current sensor 110 may provide signals indicating the current to the current estimator 118. The current sensor 110 may be configured to receive the signals indicating the current and to measure the amount of current output by the motor 102 (e.g., based on the current indicated by the signals). The current estimator 118 may be configured to either transmit the stationary frame currents of the motor 102 or transform the measured current using a position estimate from the position estimator 116 of the motor 102 into a synchronous reference frame.

The current command generator 112 may receive a torque command $T_e^*$. The current command generator 112 may generate a commanded current $I_{dq}^*$ based on the torque command. The current command may be composed of a direct axis (d-axis) $I_d^*$ and a quadrature axis (q-axis) $I_q^*$ current component. The current regulator 114 receives the commanded current and transmits an output voltage command signal $V_{dqb}^*$ to the pulse width modulator 106. The voltage command may be composed of a d-axis component $V_d^*$ and a q-axis component $V_q^*$. The pulse width modulator 106 may control the proportion of time the output voltage signal is high compared to when it is low over a consistent period of time, which may control the direction of the motor 102. The inverter 104 may include a voltage source inverter or other suitable inverter and may be configured to vary the frequency of the supply electrical energy provided to the motor 102 to control the speed of the motor 102. The motor 102 may receive an output voltage signal $V_{abc}$ as an input (e.g., which may include $V_a$, $V_b$, and $V_c$). The motor 102 may use the input to generate an amount of current $I_{abc}$ as output (e.g., which may include $I_a$, $I_b$, and $I_c$) that may be equal to the commanded current or vary from the commanded current (e.g., when there is a current harmonic).

The current $I_{abc}$ output from the motor 102 may be sensed by the current sensor 110 to determine a measured current. The current estimator 118 may receive the measured current and determine the estimated current $\hat{I}_{dq}$. The current estimator 118 outputs the estimated current $\hat{I}_{dq}$ to the current regulator 114. Accordingly, as depicted a closed-loop is used by the system 100. However, as discussed, in some instances, the measured current may be incorrect due to circuitry degradation, drift, or the like.

The current regulator 114 may receive the estimated current and compare it to the commanded current $I_{dq}*$. If there is any variation, the current regulator 114 may transmit an output voltage command signal $V_{dqb}*$ that will cause the estimated current $\hat{I}_{dq}*$ to closely match the commanded current $I_{dq}*$. As such, since the commanded current $I_{dq}*$ is constant (or varying slowly) and the estimated current $\hat{I}_{dq}$ equals the commanded current $I_{dq}*$, then the estimated current $\hat{I}_{dq}$ is also constant. When current harmonic exists in the current measurement system, the current regulator 114 may include a pulsating component in the output voltage command signal $V_{dqb}*$.

Figure 2A:
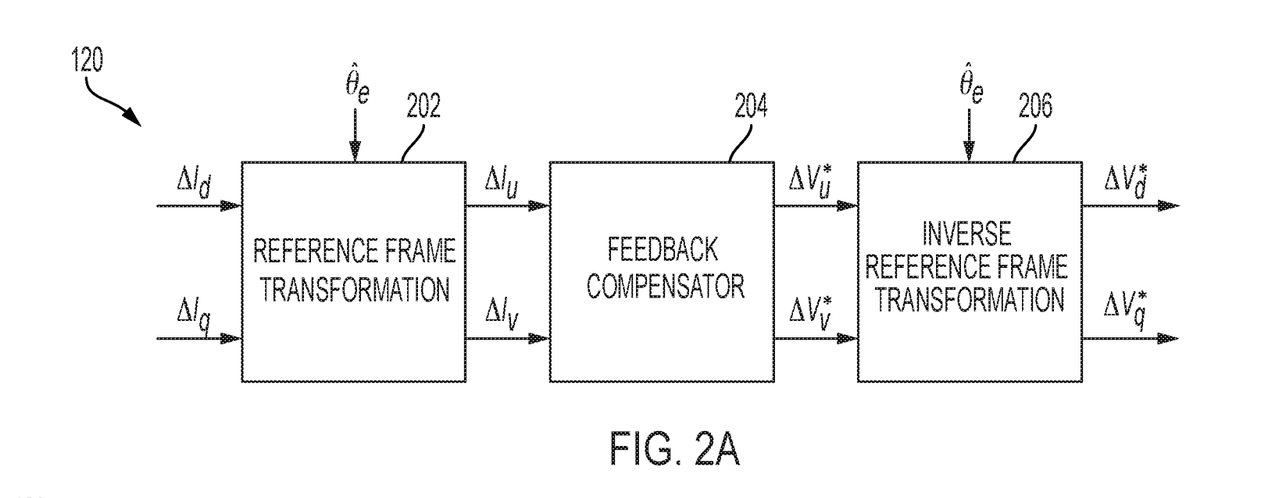
FIG. 2A-2B generally illustrate block diagrams for feedback compensation of parameter imbalance induced current harmonics according to principles of the present disclosure.
Figure 2B:
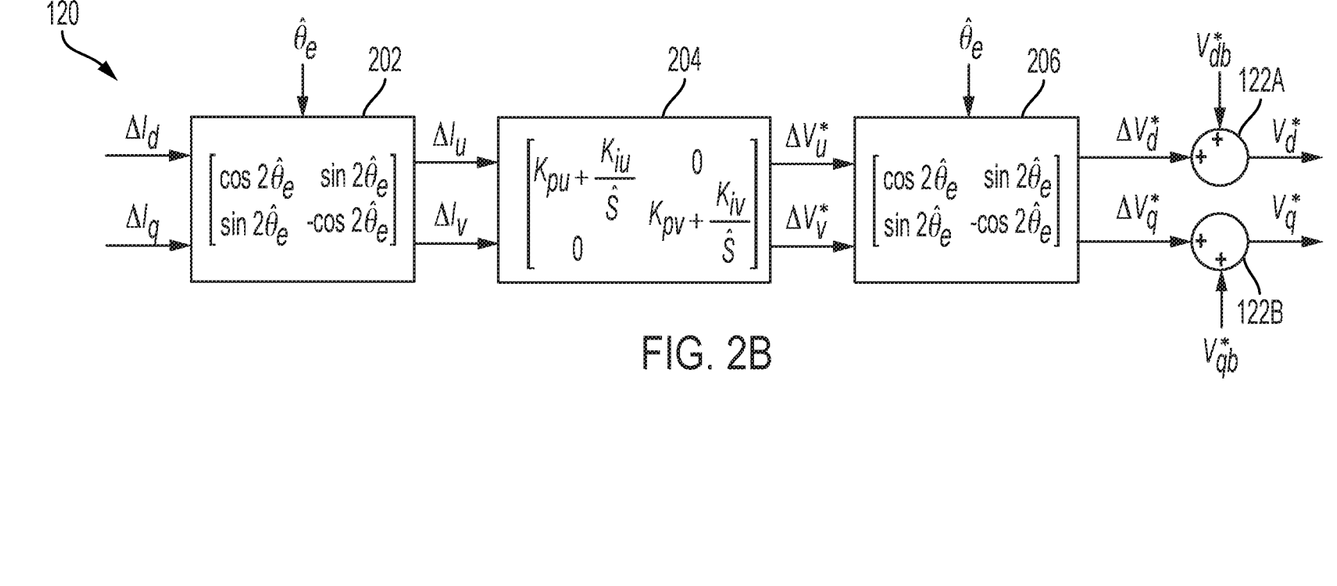

The controller 120 reads the output current signal from the current estimator 118. The controller 120 may include a reference frame transformation 202, a feedback compensator 204, and an inverse reference frame transformation 206. As will be described, controller 120 may use mathematical models to extract a signature of the current harmonic in the output current signal. The controller 120 may identify the signature of the current harmonic as a pulsating frequency of second electrical order in the output current signal.

In some embodiments, the controller 120 may use an adaptive band-pass filter to extract the pulsating component. The adaptive band-pass filter may be configured to perform pre-filtering in the synchronous frame before transformation or use adaptive low-pass filters in the pseudo-stationary framed tuned (adaptively) in accordance with the pulsation frequency equal to the twice the synchronous frequency, i.e., of second electrical order. In some embodiments, the controller 120 may perform direct sinusoidal error extraction on the output current signal. In some embodiments, controller 120 may perform demodulation to convert the sinusoidal part of the output current signal to a DC signal and thereafter perform low-pass filtering.

As will be described, the reference frame transformation 202 may receive the signature and use either an adaptive resonator for a sinusoidal signature to produce the base current harmonic correction or a conventional integrator for a DC signature to produce the base current harmonic correction. As illustrated in FIGS. 2A and 2B, the reference frame transformation 202 receives the estimated position $\hat{\theta}_e$ from the position estimated 116 and the estimated d/q currents $\Delta I_d$ and $\Delta I_q$. The reference frame transformation 202 may transform the estimated d/q currents $\Delta I_d$ and $\Delta I_q$ into the synchronous reference frame utilizing the reference frame transformation involving the estimated electrical position $\hat{\theta}_e$, which may be defined as:

$$\begin{bmatrix} \cos 2\hat{\theta}_e & \sin 2\hat{\theta}_e \\ \sin 2\hat{\theta}_e & -\cos 2\hat{\theta}_e \end{bmatrix}$$

The feedback compensator may receive the transformed currents from the reference frame transformation 202 (e.g., $\Delta I_u$ and $\Delta I_v$). The feedback compensator 204 may compensate for the current harmonic using the transformed currents according to:

$$\begin{bmatrix} K_{pu} + \frac{K_{iu}}{\hat{s}} & 0 \\ 0 & K_{pv} + \frac{K_{iv}}{\hat{s}} \end{bmatrix}$$

Where $\hat{s}$ represents a discrete time implementation of the derivative operator. The feedback compensator 204 my output compensated voltage values ($\Delta V_u*$ and $\Delta V_v*$) to the inverse reference frame transformation 206. The inverse reference frame transformation 206 may also receive the estimated position $\hat{\theta}_e$. The inverse reference frame transformation 206 may transform the voltage values into an inverse synchronized reference frame according to:

$$\begin{bmatrix} \cos 2\hat{\theta}_e & \sin 2\hat{\theta}_e \\ \sin 2\hat{\theta}_e & -\cos 2\hat{\theta}_e \end{bmatrix}$$

The inverse reference frame transformation 206 outputs the reference frame values $\Delta V_d*$ and $\Delta V_q*$ to an addition module 122A and an addition module 122B, respectively. The addition module 122A combines $\Delta V_d*$ and $V_{db}*$ and outputs $\Delta V_d*$. The addition module 122B combines $\Delta V_q*$ and $V_{qb}*$ and outputs $\Delta V_q*$.

Figure 3:
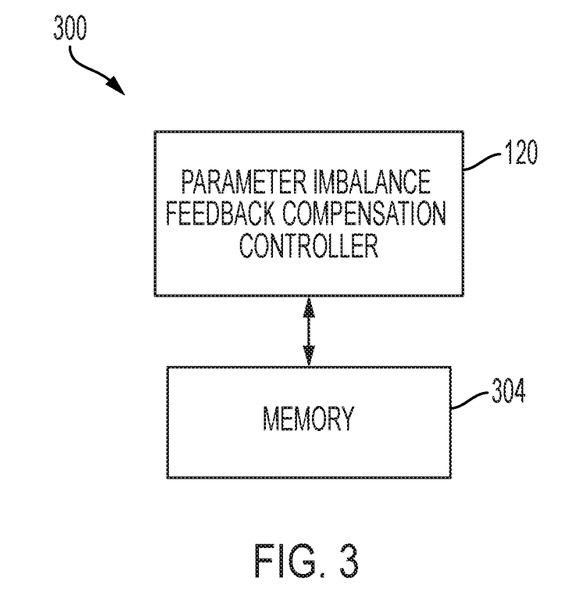
FIG. 3 generally illustrates a controller system according to principles of the present disclosure.

FIG. 3 generally illustrates a controller system 300 according to the principles of the present disclosure. The controller system 300 includes the parameter imbalance feedback compensation controller 120 communicatively coupled to a memory 302. The parameter imbalance feedback compensation controller 120 may include a processor. The processor may include any suitable processor, such as those described herein. The memory 302 may comprise a single disk or a plurality of disks (e.g., hard drives), and includes a storage management module that manages one or more partitions within the memory 302. In some embodiments, memory 302 may include flash memory, semiconductor (solid state) memory or the like. The memory 302 may include Random Access Memory (RAM), a Read-Only Memory (ROM), or a combination thereof. The memory 302 may include instructions that, when executed by the processor, cause the processor to, at least, perform the techniques disclosed herein.

In some embodiments, the controller 120 may be configure to perform closed-loop compensation of current harmonics caused by parameter imbalances. For example, the controller 120 may receive and read an output current signal. The current estimator 118 may generate the output current signal and communicate the signal to the controller 120. An output voltage signal corresponding to the output current signal may include a constant part with a negligible sinusoidal part, while the output current signal may include a constant part and a sinusoidal part.

The controller 120 may determine whether the output current signal includes a constant part and a sinusoidal part. If the controller 102 determines that the output current signal includes only a constant part, then there may be no parameter imbalance because the sinusoidal part of the output current signal represents the current harmonics that represent the signature of parameter imbalance in the synchronous motor.

Conversely, if the controller 120 determines that the output current signal includes the constant part and the sinusoidal part, the controller 120 extracts the sinusoidal part as the signature of the parameter imbalance. The controller 120 may determine, based on the extracted signature of the parameter imbalance that the synchronous motor drive 100 has the parameter imbalance.

The controller 120 may compensate, based on the signature, the current harmonics caused by the parameter imbalance. For example, the controller 120 may compensate the current harmonics caused by the parameter imbalance in a closed loop using a feedback path. The controller 120 may compensate for the parameter imbalance in real-time (e.g., in less than 2 seconds) as the synchronous motor drive 100 operates the synchronous motor 102.

In some embodiments, the controller 120 may be configured to generate a correction term that compensates for the current harmonics. The controller 120 may apply the correction term to an estimated current to output a compensated estimated current to the current regulator 114. The controller 120 may verify that a subsequent output voltage command signal received from the current regulator 114 via the feedback path does not include the current harmonics. In some embodiments, the controller 120 compensates, based on the signature, the current harmonics caused by the parameter imbalance in the closed loop using a feedback path by generating a correction voltage command term.

The controller 120 may apply the correction voltage command term to a base voltage command to output a final voltage command to the pulse width modulator 106. The pulse width modulator 106 operates the inverter 104 such that the voltage applied to the synchronous motor 102 causes the current harmonics caused by parameter imbalance to be suppressed and/or eliminated from the output current signal.

In some embodiments, the controller 120 may input the extracted signature into an adaptive resonator to output a correction term. The controller 120 may compensate for the current harmonics in a synchronous reference frame by transforming the correction term and adding it to an estimated synchronous frame current.

In some embodiments, the controller 120 may extract the signature of the parameter imbalance from the output current signal by converting the signature to a direct current signal. The controller 120 may compensate, based on the signature, for the current harmonics by converting the direct current signal to a conventional integrator to output a direct current correction term. In some embodiments, the instructions further cause the processor to apply the direct current correction term to a synchronous frame estimated current to directly compensate for the current harmonics in a synchronous reference frame In some embodiments, the system 300 may perform the methods described herein. However, the methods described herein as performed by the system 300 are not meant to be limiting, and any type of software executed on a controller can perform the methods described herein without departing from the scope of this disclosure. For example, a controller, such as a processor executing software within a computing device, can perform the methods described herein.

Figure 4:
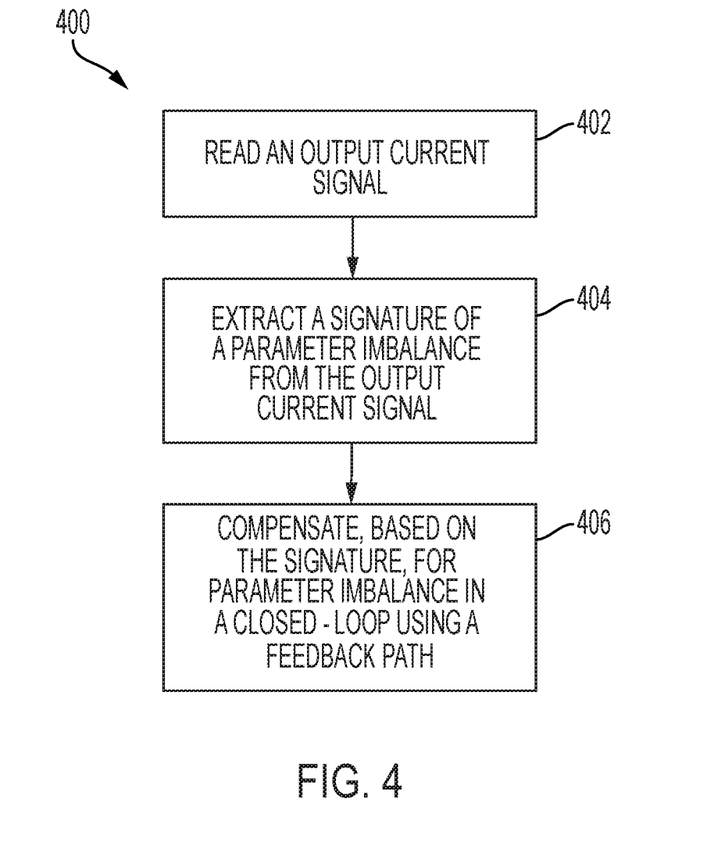
FIG. 4 is a flow diagram generally illustrating a method for closed-loop compensation of current harmonics caused by parameter imbalances in synchronous motor drives according to principles of the present disclosure.

FIG. 4 is a flow diagram generally illustrating a method 400 for closed-loop compensation of current harmonics caused by parameter imbalances in synchronous motor drives according to principles of the present disclosure. At 402, the method 400 reads an output current signal. For example, the controller 120 reads the output current signal. The current estimator 118 may generate the output current signal.

At 404, the method 400 extracts a signature of a parameter imbalance from the output current signal. For example, the controller 120 extracts the signature of the parameter imbalance from the output current signal. The controller 120 may determine, based on the extracted signature, the synchronous motor drive 100 has the parameter imbalance.

In some embodiments the output voltage signal may include just a constant part with a negligible sinusoidal part, and in some embodiments, the output current signal may include a constant part and a sinusoidal part. If the output current signal includes just a constant part, then there may be no parameter imbalance because the sinusoidal part of the output current signal represents the current harmonics that represent the signature of parameter imbalance in the synchronous motor. Accordingly, when the output current signal includes the constant part and the sinusoidal part, the sinusoidal part is extracted as the signature of the parameter imbalance.

At 406, the method 400 compensates, based on the signature, the current harmonics caused by the parameter imbalance in a closed loop using a feedback path. For example, the controller 120 compensates, based on the signature, the current harmonics caused by the parameter imbalance in the closed loop using the feedback path. In some embodiments, the controller 120 compensates for the parameter imbalance in real-time (e.g., in less than 2 seconds) as the synchronous motor drive 100 operates the synchronous motor 102. In some embodiments, the controller 120 compensates, based on the signature, the current harmonics caused by the parameter imbalance in the closed loop using a feedback path by generating a correction voltage command term, applying the correction voltage command term to a base voltage command to output a final voltage command to the pulse width modulator 106. The pulse width modulator 106 operates the inverter 104 such that the voltage applied to the synchronous motor 102 causes the current harmonics caused by parameter imbalance to be suppressed and/or eliminated from the output current signal.

In some embodiments, a system for compensating parameter imbalance induced current harmonics in a synchronous motor drive includes a synchronous motor controlled by the synchronous motor drive, a processor, and a memory. The memory includes instructions that, when executed by the processor, cause the processor to: read an output current signal; extract, based on the output current signal, a signature of a parameter imbalance corresponding to the synchronous motor drive; and compensate, based on the signature, for the current harmonics induced by parameter imbalance in a closed loop using a feedback path.

In some embodiments, the instructions further cause the processor to: generate a correction term that compensates for the current harmonics; apply the correction term to an estimated current to output a compensated estimated current to a current regulator; and verify that a subsequent output voltage command signal received from the current regulator via the feedback path does not include the current harmonics. In some embodiments, compensating for the current harmonics occurs in real-time as the synchronous motor drive controls the synchronous motor. In some embodiments, the instructions further cause the processor to extract a sinusoidal component at twice the synchronous frequency from an output voltage command signal corresponding to the output current signal. In some embodiments, the instructions further cause the processor to input the signature into an adaptive resonator to output a correction term. In some embodiments, the instructions further cause the processor to compensate for the current harmonics in a synchronous reference frame by transforming the correction term and adding it to an estimated synchronous frame current. In some embodiments, the instructions further cause the processor to extract the signature of the parameter imbalance from the output current signal by converting the signature to a direct current signal. In some embodiments, the instructions further cause the processor to compensate, based on the signature, for the current harmonics by converting the direct current signal to a conventional integrator to output a direct current correction term. In some embodiments, the instructions further cause the processor to apply the direct current correction term to a synchronous frame estimated current to directly compensate for the current harmonics in a synchronous reference frame.

In some embodiments, a method for compensating parameter imbalance induced current harmonics in a synchronous motor drive includes reading an output current signal and extracting, based on the output current signal, a signature of a parameter imbalance corresponding to the synchronous motor drive. The method also includes compensating, based on the signature, for the current harmonics induced by parameter imbalance in a closed loop using a feedback path.

In some embodiments, the method also includes generating a correction term that compensates for the current harmonics, applying the correction term to an estimated current to output a compensated estimated current to a current regulator, and verifying that a subsequent output voltage command signal received from the current regulator via the feedback path does not include the current harmonics. In some embodiments, compensating for the current harmonics occurs in real-time as the synchronous motor drive controls a synchronous motor. In some embodiments, the method also includes extracting a sinusoidal component at twice the synchronous frequency from an output voltage command signal corresponding to the output current signal. In some embodiments, the method also includes inputting the signature into an adaptive resonator to output a correction term. In some embodiments, the method also includes compensating for the current harmonics in a synchronous reference frame by transforming the correction term and adding it to an estimated synchronous frame current. In some embodiments, the method also includes extracting the signature of the parameter imbalance from the output current signal by converting the method also includes compensating, based on the signature, for the current harmonics by converting the direct current signal to a conventional integrator to output a direct current correction term. In some embodiments, the method also includes applying the direct current correction term to a synchronous frame estimated current to directly compensate for the current harmonics in a synchronous reference frame.

In some embodiments, a system for compensating parameter imbalance induced current harmonics in a synchronous motor drive includes a processor and a memory. The method includes instructions that, when executed by the processor, cause the processor to: read an output current signal; extract, based on the output current signal, a signature of a parameter imbalance corresponding to a synchronous motor drive; compensate, based on the signature, for the current harmonics induced by parameter imbalance in a closed loop using a feedback path by generating a correction voltage command term; and applying the correction voltage command term to a base voltage command to output a final voltage command to a pulse width modulator that operates an inverter of the synchronous motor drive.

In some embodiments, compensating for the current harmonics occurs in real-time as the synchronous motor drive controls the synchronous motor.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations the systems, algorithms, methods, instructions, etc., described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

As used herein, the term module can include a packaged functional hardware unit designed for use with other components, a set of instructions executable by a controller (e.g., a processor executing software or firmware), processing circuitry configured to perform a particular function, and a self-contained hardware or software component that interfaces with a larger system. For example, a module can include an application specific integrated circuit (ASIC), a Field Programmable Gate Array (FPGA), a circuit, digital logic circuit, an analog circuit, a combination of discrete circuits, gates, and other types of hardware or combination thereof. In other embodiments, a module can include memory that stores instructions executable by a controller to implement a feature of the module.

Further, in one aspect, for example, systems described herein can be implemented using a general-purpose computer or general-purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations, and aspects have been described in order to allow easy understanding of the present invention and do not limit the present invention. On the contrary, the invention is intended to cover various modifications and equivalent arrangements included within the scope of the appended claims, which scope is to be accorded the broadest interpretation to encompass all such modifications and equivalent structure as is permitted under the law.

Having thus described the invention, it is claimed:

1. A system for compensating parameter imbalance induced current harmonics in a synchronous motor drive, the system comprising:
   a synchronous motor controlled by the synchronous motor drive;
   a processor; and
   a memory that includes instructions that, when executed by the processor, cause the processor to:
   read an output current signal;
   extract, based on the output current signal, a signature of a parameter imbalance corresponding to the synchronous motor drive, wherein the signature of the parameter imbalance corresponds to a sinusoidal component of the parameter imbalance; and
   compensate for the current harmonics induced by parameter imbalance in a closed loop using a feedback path, by generating a correction voltage command term based on the signature of the parameter imbalance.

2. The system of claim 1, wherein the instructions further cause the processor to:
   apply the voltage correction term to an estimated current to output a compensated estimated current to a current regulator; and
   verify that a subsequent output voltage command signal received from the current regulator via the feedback path does not include the current harmonics.

3. The system of claim 1, wherein compensating for the current harmonics occurs in real-time as the synchronous motor drive controls the synchronous motor.

4. The system of claim 1, wherein the instructions further cause the processor to extract a sinusoidal component at twice a synchronous frequency from an output voltage command signal corresponding to the output current signal.

5. The system of claim 4, wherein the instructions further cause the processor to input the signature of the parameter imbalance into an adaptive resonator to output the voltage correction term.

6. The system of claim 5, wherein the instructions further cause the processor to compensate for the current harmonics in a synchronous reference frame by transforming the voltage correction term and adding it to an estimated synchronous frame current.

7. The system of claim 1, wherein the instructions further cause the processor to extract the signature of the parameter imbalance from the output current signal by converting the signature of the parameter imbalance to a direct current signal.

8. The system of claim 7, wherein the instructions further cause the processor to compensate, based on the signature of the parameter imbalance, for the current harmonics by converting the direct current signal to a conventional integrator to output a direct current correction term.

9. The system of claim 8, wherein the instructions further cause the processor to apply the direct current correction term to a synchronous frame estimated current to directly compensate for the current harmonics in a synchronous reference frame.

10. A method for compensating parameter imbalance induced current harmonics in a synchronous motor drive, the method comprising:
    reading an output current signal;
    extracting, based on the output current signal, a signature of a parameter imbalance corresponding to the synchronous motor drive, wherein the signature of the parameter imbalance corresponds to a sinusoidal component of the parameter imbalance; and
    compensating for the current harmonics induced by parameter imbalance in a closed loop using a feedback path, by generating a correction voltage command term based on the signature of the parameter imbalance.

11. The method of claim 10, further comprising:
    applying the voltage correction term to an estimated current to output a compensated estimated current to a current regulator; and
    verifying that a subsequent output voltage command signal received from the current regulator via the feedback path does not include the current harmonics.

12. The method of claim 10, wherein compensating for the current harmonics occurs in real-time as the synchronous motor drive controls a synchronous motor.

13. The method of claim 10, further comprising extracting a sinusoidal component at twice a synchronous frequency from an output voltage command signal corresponding to the output current signal.

14. The method of claim 13, further comprising inputting the signature of the parameter imbalance into an adaptive resonator to output the voltage correction term.

15. The method of claim 14, further comprising compensating for the current harmonics in a synchronous reference frame by transforming the voltage correction term and adding it to an estimated synchronous frame current.

16. The method of claim 10, further comprising extracting the signature of the parameter imbalance from the output current signal by converting the signature of the parameter imbalance to a direct current signal.

17. The method of claim 16, further comprising compensating, based on the signature of the parameter imbalance, for the current harmonics by converting the direct current signal to a conventional integrator to output a direct current correction term.

18. The method of claim 17, further comprising applying the direct current correction term to a synchronous frame estimated current to directly compensate for the current harmonics in a synchronous reference frame.

19. A system for compensating parameter imbalance induced current harmonics in a synchronous motor drive, the system comprising:
- a processor; and
- a memory that includes instructions that, when executed by the processor, cause the processor to:
  - read an output current signal;
  - extract, based on the output current signal, a signature of a parameter imbalance corresponding to a synchronous motor drive, wherein the signature of the parameter imbalance corresponds to a sinusoidal component of the parameter imbalance;
  - compensate for the current harmonics induced by parameter imbalance in a closed loop using a feedback path by generating a voltage correction command term based on the signature of the parameter imbalance; and
  - applying the voltage correction command term to a base voltage command to output a final voltage command to a pulse width modulator that operates an inverter of the synchronous motor drive.

20. The system of claim 19, wherein compensating for the current harmonics occurs in real-time as the synchronous motor drive controls a synchronous motor.

* * * * *